(12) United States Patent
Xie et al.

(10) Patent No.: US 11,509,859 B2
(45) Date of Patent: Nov. 22, 2022

(54) VIDEO DECODING METHOD AND CAMERA

(71) Applicant: ARASHI VISION INC., Shenzhen (CN)

(72) Inventors: Liang Xie, Shenzhen (CN); Jingkang Liu, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 241 days.

(21) Appl. No.: 16/770,945

(22) PCT Filed: Nov. 16, 2018

(86) PCT No.: PCT/CN2018/115852
§ 371 (c)(1),
(2) Date: Jun. 8, 2020

(87) PCT Pub. No.: WO2019/120012
PCT Pub. Date: Jun. 27, 2019

(65) Prior Publication Data
US 2021/0185274 A1   Jun. 17, 2021

(30) Foreign Application Priority Data
Dec. 20, 2017   (CN) .......................... 201711385671.4

(51) Int. Cl.
*H04N 7/01* (2006.01)
*H04N 5/232* (2006.01)
(52) U.S. Cl.
CPC ....... *H04N 7/0127* (2013.01); *H04N 5/23229* (2013.01); *H04N 7/0117* (2013.01); *H04N 7/0137* (2013.01)

(58) Field of Classification Search
CPC ............. H04N 7/0127; H04N 5/23229; H04N 7/0117; H04N 7/0137; H04N 19/587; H04N 19/521; H04N 19/577; H04N 7/0135
See application file for complete search history.

(56) References Cited

U.S. PATENT DOCUMENTS 5,541,667 A    7/1996  Saito
9,131,202 B1 * 9/2015  Espeset ................ G11B 27/034
(Continued)

FOREIGN PATENT DOCUMENTS

CN    101325044 A    12/2008
CN    101399950 A    4/2009
(Continued)

*Primary Examiner* — Gevell V Selby
(74) *Attorney, Agent, or Firm* — Cheng-Ju Chiang

(57) ABSTRACT

The present invention provides a video decoding method and a camera. Said method comprises: loading a video, and decoding each frame from the video; calculating, for any two adjacent frames, a first optical flow field; calculating, according to the first optical flow field, a second optical flow field of a position where a frame is to be inserted, the position being located between two adjacent frames; using the second optical flow field to calculate a corresponding pixel position, in a previous frame of two adjacent frames, of each pixel of the frame to be inserted, and assigning the pixel value of the previous frame to the pixel of the frame to be inserted; and placing the inserted frame and the decoded original frame together according to a time sequence, so as to reconstitute a video having a high frame rate. The present invention eliminates or improves discrete motion, providing a more fluent viewing experience.

17 Claims, 1 Drawing Sheet

(56) References Cited

U.S. PATENT DOCUMENTS

2013/0322537 A1* 12/2013 Rossato ................. H04N 19/87
 375/240.16
2017/0094305 A1* 3/2017 Li ........................ H04N 19/136
2019/0180454 A1* 6/2019 Choudhury ............ H04N 19/46

FOREIGN PATENT DOCUMENTS

| CN | 102509071 A | 6/2012 |
| CN | 103139524 A | 6/2013 |
| CN | 103888767 A | 6/2014 |
| CN | 108040217 A | 5/2018 |

* cited by examiner

VIDEO DECODING METHOD AND CAMERA

CROSS REFERENCE TO RELATED APPLICATIONS

The present application is a 35 U.S.C. § 371 National Phase conversion of International (PCT) Patent Application No. PCT/CN2018/115852, filed on Nov. 16, 2018, which claims priority of Chinese Patent Application No. 201711385671.4, filed on Dec. 20, 2017, the disclosure of which is incorporated by reference herein. The PCT International Patent Application was filed and published in Chinese.

FIELD OF THE INVENTION

The present invention relates generally to the field of video processing, and more specifically to a video decoding method and a camera.

BACKGROUND OF THE INVENTION

The camera shoots video of moving objects, especially when shooting high-speed moving objects, objects in the video may have discontinuous motion due to insufficient video frame rate. This phenomenon is particularly noticeable when the playback speed is reduced to view slow motion.

SUMMARY OF THE INVENTION

Technical Problem

The object of the present invention is to provide a video decoding method, a computer-readable medium and a camera, so as to solve the problem of discontinuous motion of moving objects in the video due to insufficient frame rate.

Technical Solution

In a first aspect, the present invention provides a video decoding method, comprising steps of:
loading a video and decoding each frame from the video;
calculating a first optical flow field for any two adjacent frames;
calculating, according to the first optical flow field, a second optical flow field of a position where a frame is to be inserted, the position being located between two adjacent frames;
using the second optical flow field to calculate a corresponding pixel position, in a previous frame of two adjacent frames, of each pixel of the frame to be inserted, and assigning a pixel value of the previous frame to a pixel of the frame to be inserted; and
placing inserted frames and decoded original frames together in chronological order so as to reconstruct a high-frame-rate video.

In a second aspect, the present invention provides a computer-readable medium that stores a computer program or programs, the computer program or programs are to be executed by one processor or more processors to perform steps of the video decoding method as described above.

In a third aspect, the present invention provides a camera, comprising: one or more processors, a memory, and one or more computer programs, where the processor and the memory are connected by a bus, and the one or more computer programs are stored in the memory and are configured to be executed by the one or more processors to perform steps of the video decoding method as described above.

Advantages

In the present invention, calculating a first optical flow field for any two adjacent frames; calculating, according to the first optical flow field, a second optical flow field of a position where a frame is to be inserted; using the second optical flow field to calculate a corresponding pixel position, in a previous frame of two adjacent frames, of each pixel of the frame to be inserted, and assigning a pixel value of the previous frame to a pixel of the frame to be inserted; placing inserted frames and decoded original frames together in chronological order so as to reconstruct a high-frame-rate video; thereby eliminating or eliminates or improving discrete motion, and providing a more fluent viewing experience.

THE BEST EMBODIMENT OF THE INVENTION

In order to make the objects, technical solutions and advantages of the present invention clearer, the present invention will be further described in detail below in conjunction with the accompanying drawings and embodiments. It should be understood that the specific embodiments described herein are only used to explain the present invention, and are not intended to limit the present invention.

In order to explain the technical solution of the present invention, the following will be described with specific embodiments.

First Embodiment

Figure 1:
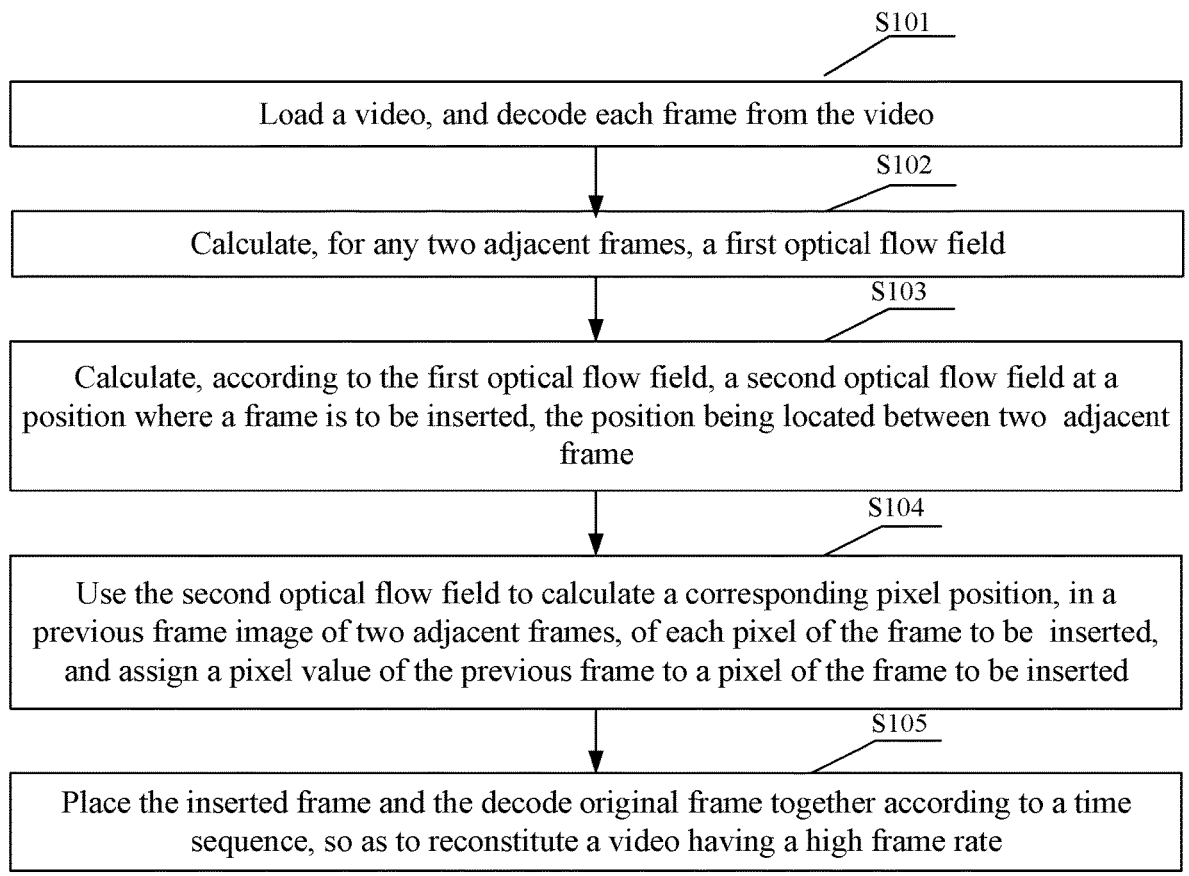
FIG. 1 is a flow diagram of a video decoding method in accordance with a first embodiment of the present invention.

Referring to FIG. 1, a video decoding method provided in the first embodiment of the present invention includes the following steps. It should be noted that the video decoding method of the present invention is not limited to the flow order as shown in FIG. 1 if there are substantially the same results.

S101, loading a video and decoding each frame from the video.

S102, calculating a first optical flow field for any two adjacent frames.

In the first embodiment of the present invention, S102 may specifically comprise steps of:
downsampling any two adjacent frames to a suitable resolution;
calculating an optical flow of the two adjacent frames after downsampling to obtain the first optical flow field with a reduced resolution;
upsampling the first optical flow field to an original image resolution to obtain the first optical flow field of the original image resolution.

In the first embodiment of the present invention, after the step of upsampling the first optical flow field to an original image resolution to obtain the first optical flow field of the original image resolution, the method may further include the following step:

smoothing the first optical flow field of the original image resolution to ensure continuity; specifically, multiplying the optical flow of the first optical flow field of the original image resolution by a sampling coefficient to ensure that the optical flow is correct at the original image resolution.

S103, calculating, according to the first optical flow field, a second optical flow field of a position where a frame is to be inserted, the position being located between two adjacent frames.

In the first embodiment of the present invention, S103 can be:

marking the first optical flow field from the first frame $I_1$ to the second frame $I_2$ in the adjacent two frames as $M_1$; when inserting a frame between the first frame $I_1$ and the second frame $I_2$, marking the second optical flow field from the inserted frame to the first frame $I_1$ as M, then: $M(x+dx, y+dy)=-M_1(x,y)/2$, where $(dx,dy)=M_1(x,y)$, which is a motion vector from the (x, y) coordinate in the first frame $I_1$ to the second frame $I_2$.

Since the second optical flow field M may have holes, that is, there are invalid coordinates. Therefore, in the first embodiment of the present invention, after calculating a second optical flow field of a position where a frame is to be inserted, the method may further include the following step:

for the invalid coordinates in the second optical flow field, taking a minimum area (such as a square, a rectangle, etc.) around the invalid coordinates where the area contains valid coordinates, and then filling a mean optical flow of the valid coordinates onto the invalid coordinates so as to fill the holes in the second optical flow, and finally smoothing the second optical flow field M.

S104, using the second optical flow field to calculate a corresponding pixel position, in a previous frame of two adjacent frames, of each pixel of the frame to be inserted, and assigning a pixel value of the previous frame to a pixel of the frame to be inserted.

In the first embodiment of the present invention, S104 can be:

marking the inserted frame as I and the second optical flow field as M; calculating a position (x+dx,y+dy) of each coordinate (x, y) of the inserted frame I in the first frame $I_1$ of the two adjacent frames, where (dx,dy)=M(x,y) is a motion vector at the coordinates (x, y) from the inserted frame I to the first frame $I_1$; and assigning a value to each pixel of the inserted frame I, where the specific formula is: $I(x,y)=I_1(x+dx,y+dy)$.

S105, placing inserted frames and decoded original frames together in chronological order so as to reconstruct a high-frame-rate video.

In the first embodiment of the present invention, S105 can be:

marking a frame sequence decoded from the video as $I_i$ . . . , and the frame inserted between the frame $I_i$ and $I_{i+1}$ using optical flow as $I_i'$; and encoding these frames in an order $I_1, I_1', I_2, I_2'$ . . . into a video flow so as to form a high frame rate video.

Second Embodiment

In accordance with a second embodiment, the present invention provides a computer-readable medium that stores a computer program or programs, the computer program or programs are to be executed by a processor or processors to perform steps of the video decoding method provided in the first embodiment of the present invention.

Third Embodiment

Figure 2:
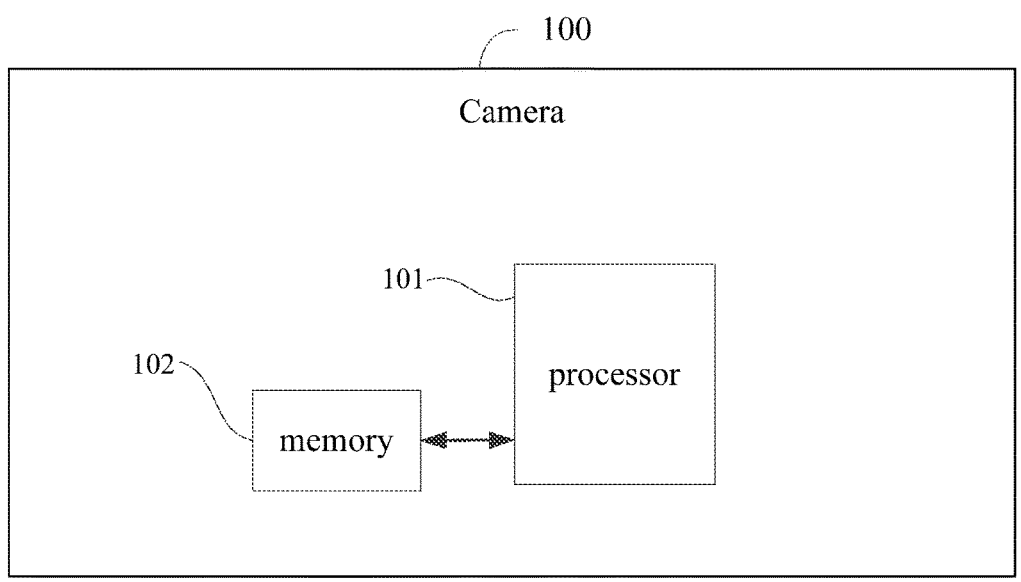
FIG. 2 is a schematic diagram of a camera in accordance with a third embodiment of the present invention.

FIG. 2 shows a block diagram of a camera 100 provided in the third embodiment of the present invention. A camera 100 comprises: one or more processors 101, a memory 102, and one or more computer programs, where the processor 101 and the memory 102 are connected by a bus, and the one or more computer programs are stored in the memory 102 and are configured to be executed by the one or more processors 101 to perform steps of the video decoding method provided in the first embodiment of the present invention.

In the present invention, calculating a first optical flow field for any two adjacent frames; calculating, according to the first optical flow field, a second optical flow field of a position where a frame is to be inserted; using the second optical flow field to calculate a corresponding pixel position, in a previous frame of two adjacent frames, of each pixel of the frame to be inserted, and assigning a pixel value of the previous frame to a pixel of the frame to be inserted; placing inserted frames and decoded original frames together in chronological order so as to reconstruct a high-frame-rate video; thereby eliminating or eliminates or improving discrete motion, and providing a more fluent viewing experience.

A person of ordinary skill in the art may understand that all or part of the steps in the various methods of the above embodiments may be completed by a program or programs instructing related hardware. The program or programs can be stored in a computer-readable storage medium, and the storage media can be, ROM (ROM, Read Only Memory), RAM (RAM, Random Access Memory), magnetic disk, optical disk, etc.

The above are only preferred embodiments of the present invention and are not intended to limit the present invention. Any modification, equivalents replacements and improvements made within the spirit and principle of the present invention should be included within the scope of the present invention.

What is claimed is:

1. A video decoding method, comprising steps of:
loading a video and decoding each frame from the video;
calculating a first optical flow field for any two adjacent frames;
calculating, according to the first optical flow field, a second optical flow field of a position where a frame is to be inserted, the position being located between two adjacent frames;
using the second optical flow field to calculate a corresponding pixel position, in a previous frame of two adjacent frames, of each pixel of the frame to be inserted, and assigning a pixel value of the previous frame to a pixel of the frame to be inserted; and
placing inserted frames and decoded original frames together in chronological order so as to reconstruct a high-frame-rate video;
wherein the step of calculating a first optical flow field for any two adjacent frames, comprises:
downsampling any two adjacent frames to a suitable resolution;
calculating an optical flow of the two adjacent frames after downsampling to obtain the first optical flow field with a reduced resolution;

upsampling the first optical flow field to an original image resolution to obtain the first optical flow field of the original image resolution.

2. The method of claim 1, wherein after the step of upsampling the first optical flow field to an original image resolution to obtain the first optical flow field of the original image resolution, the method further comprises a step:

smoothing the first optical flow field of the original image resolution to ensure continuity.

3. The method of claim 2, wherein the step of smoothing the first optical flow field of the original image resolution to ensure continuity, specifically be:

multiplying the optical flow of the first optical flow field of the original image resolution by a sampling coefficient to ensure that the optical flow is correct at the original image resolution.

4. The method of claim 1, wherein the step of calculating, according to the first optical flow field, a second optical flow field of a position where a frame is to be inserted, the position being located between two adjacent frames, specifically be:

marking a first optical flow field from a first frame $I_1$ to a second frame 12 in the adjacent two frames as $M_1$; when inserting a frame between the first frame $I_1$ and the second frame $I_2$, marking a second optical flow field from the inserted frame to the first frame $I_1$ as M, then: $M(x+dx,y+dy)=-M_1(x,y)/2$, where $(dx,dy)=M_1(x,y)$, which is a motion vector from the (x, y) coordinate in the first frame $I_1$ to the second frame $I_2$.

5. The method of claim 4, wherein after calculating a second optical flow field of a position where a frame is to be inserted, the method further comprises:

for invalid coordinates in the second optical flow field, taking a minimum area around the invalid coordinates where the area contains valid coordinates, and then filling a mean optical flow of the valid coordinates onto the invalid coordinates to fill the holes in the second optical flow, and finally smoothing the second optical flow field M.

6. The method of claim 1, wherein the step of using the second optical flow field to calculate a corresponding pixel position, in a previous frame of two adjacent frames, of each pixel of the frame to be inserted, and assigning a pixel value of the previous frame to a pixel of the frame to be inserted, specifically be:

marking the inserted frame as I and the second optical flow field as M; calculating a position (x+dx,y+dy) of each coordinate (x, y) of the inserted frame I in the first frame $I_1$ of the two adjacent frames, where (dx,dy)=M(x,y) is a motion vector at the coordinates (x, y) from the inserted frame I to the first frame $I_1$; and assigning a value to each pixel of the inserted frame I, where the specific formula is: $I(x,y)=I_1(x+dx,y+dy)$.

7. The method of claim 1, wherein the step of placing inserted frames and decoded original frames together in chronological order so as to reconstruct a high-frame-rate video, specifically be:

marking a frame sequence decoded from the video as $I_1$, $I_{i+1}$ . . . , and the frame inserted between the frame $I_i$ and $I_{i+1}$ using optical flow as $I_i'$, and encoding the frames in an order $I_1$, $I_1'$, $I_2$, $I_2'$ . . . into a video flow so as to form a high frame rate video.

8. A non-transitory computer-readable medium that stores a set of computer-executive program instructions, wherein the set of computer-executive program instructions are executed by one or more processors to perform steps of:

loading a video and decoding each frame from the video;

calculating a first optical flow field for any two adjacent frames;

calculating, according to the first optical flow field, a second optical flow field of a position where a frame is to be inserted, the position being located between two adjacent frames;

using the second optical flow field to calculate a corresponding pixel position, in a previous frame of two adjacent frames, of each pixel of the frame to be inserted, and assigning a pixel value of the previous frame to a pixel of the frame to be inserted; and placing inserted frames and decoded original frames together in chronological order so as to reconstruct a high-frame-rate video;

wherein the step of using the second optical flow field to calculate a corresponding pixel position, in a previous frame of two adjacent frames, of each pixel of the frame to be inserted, and assigning a pixel value of the previous frame to a pixel of the frame to be inserted, specifically be:

marking the inserted frame as I and the second optical flow field as M; calculating a position (x+dx,y+dy) of each coordinate (x, y) of the inserted frame I in the first frame $I_1$ of the two adjacent frames, where (dx,dy)=M(x,y) is a motion vector at the coordinates (x, y) from the inserted frame I to the first frame $I_1$; and assigning a value to each pixel of the inserted frame I, where the specific formula is: $I(x,y)=I_1(x+dx,y+dy)$.

9. The medium of claim 8, wherein the step of calculating a first optical flow field for any two adjacent frames, comprises:

downsampling any two adjacent frames to a suitable resolution;

calculating an optical flow of the two adjacent frames after downsampling to obtain the first optical flow field with a reduced resolution;

upsampling the first optical flow field to an original image resolution to obtain the first optical flow field of the original image resolution.

10. The medium of claim 9, wherein after the step of upsampling the first optical flow field to an original image resolution to obtain the first optical flow field of the original image resolution, the method further comprises a step:

smoothing the first optical flow field of the original image resolution to ensure continuity; specifically be:

multiplying the optical flow of the first optical flow field of the original image resolution by a sampling coefficient to ensure that the optical flow is correct at the original image resolution.

11. The medium of claim 8, wherein the step of calculating, according to the first optical flow field, a second optical flow field of a position where a frame is to be inserted, the position being located between two adjacent frames, specifically be:

marking a first optical flow field from a first frame $I_1$ to a second frame $I_2$ in the adjacent two frames as $M_1$; when inserting a frame between the first frame $I_1$ and the second frame $I_2$, marking a second optical flow field from the inserted frame to the first frame $I_1$ as M, then: $M(x+dx,y+dy)=-M_1(x,y)/2$, where $(dx,dy)=M_1(x,y)$, which is a motion vector from the (x, y) coordinate in the first frame $I_1$ to the second frame $I_2$;

after calculating a second optical flow field of a position where a frame is to be inserted, the method further comprises:

for invalid coordinates in the second optical flow field, taking a minimum area around the invalid coordinates where the area contains valid coordinates, and then filling a mean optical flow of the valid coordinates onto the invalid coordinates to fill the holes in the second optical flow, and finally smoothing the second optical flow field M.

12. The medium of claim 8, wherein the step of placing inserted frames and decoded original frames together in chronological order so as to reconstruct a high-frame-rate video, specifically be:

marking a frame sequence decoded from the video as $I_i$, $I_{i+1}$ ..., and the frame inserted between the frame $I_i$ and $I_{i+1}$ using optical flow as $I_i'$; and encoding the frames in an order $I_1$, $I_1'$, $I_2$, $I_2'$ ... into a video flow so as to form a high frame rate video.

13. A camera, comprising: one or more processors, a non-transitory, computer readable memory, and a set of computer-executive program instructions, wherein the processor and the memory are connected by a bus, and the set of computer-executive program instructions are stored in the memory and are configured to be executed by the one or more processors to perform steps of:

loading a video and decoding each frame from the video;

calculating a first optical flow field for any two adjacent frames;

calculating, according to the first optical flow field, a second optical flow field of a position where a frame is to be inserted, the position being located between two adjacent frames;

using the second optical flow field to calculate a corresponding pixel position, in a previous frame of two adjacent frames, of each pixel of the frame to be inserted, and assigning a pixel value of the previous frame to a pixel of the frame to be inserted; and placing inserted frames and decoded original frames together in chronological order so as to reconstruct a high-frame-rate video;

wherein the step of placing inserted frames and decoded original frames together in chronological order so as to reconstruct a high-frame-rate video, specifically be:

marking a frame sequence decoded from the video as $I_i$, $I_{i+1}$, ..., and the frame inserted between the frame $I_i$ and $I_{i+1}$ using optical flow as $I_i'$; and encoding the frames in an order $I_1$, $I_1'$, $I_2$, $I_2'$ ... into a video flow so as to form a high frame rate video.

14. The camera of claim 13, wherein the step of calculating a first optical flow field for any two adjacent frames, comprises:

downsampling any two adjacent frames to a suitable resolution;

calculating an optical flow of the two adjacent frames after downsampling to obtain the first optical flow field with a reduced resolution;

upsampling the first optical flow field to an original image resolution to obtain the first optical flow field of the original image resolution.

15. The camera of claim 14, wherein after the step of upsampling the first optical flow field to an original image resolution to obtain the first optical flow field of the original image resolution, the method further comprises a step:

smoothing the first optical flow field of the original image resolution to ensure continuity; specifically be:

multiplying the optical flow of the first optical flow field of the original image resolution by a sampling coefficient to ensure that the optical flow is correct at the original image resolution.

16. The camera of claim 13, wherein the step of calculating, according to the first optical flow field, a second optical flow field of a position where a frame is to be inserted, the position being located between two adjacent frames, specifically be:

marking a first optical flow field from a first frame $I_1$ to a second frame $I_2$ in the adjacent two frames as $M_1$; when inserting a frame between the first frame $I_1$ and the second frame $I_2$, marking a second optical flow field from the inserted frame to the first frame $I_1$ as M, then: $M(x+dx,y+dy)=-M_1(x,y)/2$, where $(dx,dy)=M_1(x,y)$, which is a motion vector from the (x, y) coordinate in the first frame $I_1$ to the second frame $I_2$;

after calculating a second optical flow field of a position where a frame is to be inserted, the method further comprises:

for invalid coordinates in the second optical flow field, taking a minimum area around the invalid coordinates where the area contains valid coordinates, and then filling a mean optical flow of the valid coordinates onto the invalid coordinates to fill the holes in the second optical flow, and finally smoothing the second optical flow field M.

17. The camera of claim 13, wherein the step of using the second optical flow field to calculate a corresponding pixel position, in a previous frame of two adjacent frames, of each pixel of the frame to be inserted, and assigning a pixel value of the previous frame to a pixel of the frame to be inserted, specifically be:

marking the inserted frame as I and the second optical flow field as M; calculating a position (x+dx,y+dy) of each coordinate (x, y) of the inserted frame I in the first frame $I_1$ of the two adjacent frames, where (dx,dy)=M(x,y) is a motion vector at the coordinates (x, y) from the inserted frame I to the first frame $I_1$; and assigning a value to each pixel of the inserted frame I, where the specific formula is: $I(x,y)=Ii(x+dx,y+dy)$.

* * * * *